(12) United States Patent
Hohmann, Jr.

(10) Patent No.: US 7,754,304 B1
(45) Date of Patent: Jul. 13, 2010

(54) WEATHERPROOFING BACKER FOR WINDOW AND DOOR INSTALLATION

(75) Inventor: Ronald P. Hohmann, Jr., Hauppauge, NY (US)

(73) Assignee: MiTek Holdings, Inc., Wilmington, DE (US)

( * ) Notice: Subject to any disclaimer, the term of this patent is extended or adjusted under 35 U.S.C. 154(b) by 1055 days.

(21) Appl. No.: 11/318,761

(22) Filed: Dec. 27, 2005

(51) Int. Cl.
*B32B 5/18* (2006.01)
*B32B 7/00* (2006.01)

(52) U.S. Cl. .............. 428/40.1; 428/295.1; 428/297.1; 52/58; 52/302.6; 52/204.55; 52/383; 52/37; 156/40

(58) Field of Classification Search ................ None
See application file for complete search history.

(56) References Cited

U.S. PATENT DOCUMENTS

| | | | |
|---|---|---|---|
| 4,421,807 A | 12/1983 | Clausing et al. | |
| 4,903,455 A * | 2/1990 | Veazey | 52/800.11 |
| 5,005,962 A * | 4/1991 | Edelman | 359/864 |
| 5,106,447 A | 4/1992 | Di Rado et al. | 156/334 |
| 5,377,464 A | 1/1995 | Mott et al. | 52/213 |
| 5,586,415 A * | 12/1996 | Fisher et al. | 52/58 |
| 6,244,001 B1 | 6/2001 | Anastasi | 52/215 |
| 6,305,130 B1 | 10/2001 | Ackerman, Jr. | 52/58 |
| 6,401,402 B1 | 6/2002 | Williams | 52/58 |
| 6,451,398 B1 * | 9/2002 | Sylvester | 428/41.8 |
| 6,479,119 B1 | 11/2002 | Simpson | 428/40.1 |
| 6,584,746 B1 * | 7/2003 | Hohmann et al. | 52/513 |
| 6,627,017 B2 | 9/2003 | Simpson | 156/71 |
| 6,725,610 B2 | 4/2004 | Murphy et al. | 52/58 |
| 6,776,948 B1 * | 8/2004 | Arvidson et al. | 264/321 |
| 6,848,220 B2 | 2/2005 | Faurholdt et al. | 52/58 |
| 7,217,455 B2 * | 5/2007 | Valdez | 428/343 |
| 2002/0108326 A1 | 8/2002 | Ackerman, Jr. | 52/204.5 |

(Continued)

FOREIGN PATENT DOCUMENTS

WO WO 02097000 A1 * 12/2002

OTHER PUBLICATIONS

MFM Building Products Corp. *Weatherproofing and Sealing Systems ; Technical Information*, 7pp. (Coshoston, Ohio :2009).

(Continued)

*Primary Examiner*—Jennifer C McNeil
*Assistant Examiner*—Vera Katz
(74) *Attorney, Agent, or Firm*—Siegmar Silber, Esq.

(57) ABSTRACT

A weatherproofing backer for installing windows and doors is described as having a foam layer and an adhesive layer. The adhesive is pressure-activated and is self-sealing about attaching hardware. The foam is self-setting and, in use, molds to the flange of the window unit. When installed, the foam layer is compressed between the inner window frame and rough opening and between the window flange and the wall surface adjacent the rough opening. The weatherproofing backer is designed to extend beyond the flange of the window unit and thereby receive the weatherproofing membrane thereover. The weatherproofing backer, then acts as a sealed bridge between the membrane and the window unit precluding entry of air and water. Both the foam and the adhesive have fire retardants in the formulation thereof. A tape form with a self-skinned foam layer and a sheet form, with polymeric covering web are provided.

26 Claims, 5 Drawing Sheets

U.S. PATENT DOCUMENTS

| | | | |
|---|---|---|---|
| 2005/0011140 A1 | 1/2005 | Ackerman et al. | 52/58 |
| 2006/0010788 A1* | 1/2006 | Nettleton | 52/58 |
| 2006/0080902 A1* | 4/2006 | Bren | 52/58 |
| 2006/0101726 A1 | 5/2006 | Collins | |

OTHER PUBLICATIONS

York Manufacturing, Inc. *Jamflash® Spec Sheet*, 2pp. (Sanford, ME).

Tarco, *Online Catalogue entry for LeakBarrier Door and Window Tape*, 2 pp. (Little Rock, AR ; Jun. 21, 2005).

Clark/Hammerbeam Corporation, *Aquaseal information Sheet*. 2 pp. (Dedham, MA).

Tamko Roofing Products, Inc. *Advertisement for window and roof waterproofing products*. 1 pp. (Joplin, MO ; 2004).

MFM Building Products Corp. "Window Wrap™"; *Shelter Magazine*. (Jun. 2005).

MFM Building Products Corp. *Data Sheet for Window Wrap™*. 2pp. (Coshocton, OH).

E.I. duPont de Nemows and Company, Inc. *Installation Guidelines for DuPont™ Flashing Systems™ with integral flanged windows After weather-resistive barrier is installed*. 5 pp. (Wilmington, DE ; 2004).

E.I. du Pont de Nemows and Company, Inc. *Installation Guidelines for DuPont™ Flashing Systems™, Before Weather-resistive barrier is installed*. 5 pp. (Wilmington, DE ; 2004).

Protecto Wrap, Inc. *Newsrelease—Protecto Wrap BT20XL Tape*. 3pp. (Denver, CO).

Kelcom, Inc. *Protecto Wrap Spec*. 3 pp. (Ekhart, IN).

Kelcom, Inc. *Instructions for Installation of Protecta Wrap*. 2pp. (Ekhart, IN).

Lennel Specialties Corporation. *Window Flashing System Installation Instructions for Punched Window Openings With Loose Steel Lintels*. 23 pp. (Stoughton, MA).

Spier, John. "Not-So-Rough Openings : Framing exterior openings precisely will make installing the windows and doors a breeze." *Fine Home building*. p. 56-59. Dec. 2005/Jan. 2006.

\* cited by examiner

WEATHERPROOFING BACKER FOR WINDOW AND DOOR INSTALLATION

BACKGROUND OF THE INVENTION

1. Field of the Invention

This invention relates to a weatherproofing backer device that in a building structure is overlaid by a weatherproofing membrane and by a flange of a window or door unit so that the device bridges the two construction elements. More particularly, the backer device provides a seal without the use of conventional flashings, caulking compounds, or insulation. As the material of the device is self-setting and conforms to the geometry of the flange, the backer device provides an expansion joint therefor. Two embodiments are shown, namely, a peel-and-stick backer product and a broad-tape backer product, both of which utilize advanced adhesive technology. The adhesives are all pressure-activated and are compatible with the surfaces of the rough openings prepared for installation of the window and door units.

2. Description of the Prior Art

In the past, window flashing constructions have been complicated devices requiring many installation steps including fastening with self-tapping screws, applying adhesives, installing air/vapor barriers, filling the joint between the window frame and rough opening with insulation, and applying additional beads of caulking and tape over the window flanges. Even with great care consistent waterproofing has been elusive, and additionally air/water vapor barriers have failed. With time caulking has deteriorated and lost integrity, insulation has shifted and been dislodged, and thermal expansion and contraction has formed channels permitting water to seep into interiors.

Moisture penetration in and around windows and doors has been the cause of damage to metal and wooden studs, sheathing, and interior wallboard and finishes thereof. In response to such problems, numerous approaches have been proposed. A selection of marketed and/or patented devices purporting to obviate the above-stated concerns are reviewed in the following paragraphs describing the prior art.

A common approach to flanged window installation is the use of window sealing tape which is applied on the sill and overlapped with vertical strips on the jambs. The tape is recommended for use with a continuous bead of sealant or caulking on the installed strips and along the header. The bead of sealant or caulking is disposed so as to correspond with the flanged portion of the window assembly and, upon insertion of the window assembly, the bead is compressed. Thereafter, the window sealing tape is applied atop the header flange with an additional bead of sealant or caulking. This also overlaps the right and left jamb tapes. Optionally, tape is applied on the exterior of the flanges with additional beads of sealant and caulking and thereby substantially enveloping the flanges of the window assembly.

Subsequent to this development, Ackerman provided a window flashing in U.S. Pat. No. 6,305,130 wherein an L-shaped flashing was formed with a raised water dam. The legs of the flashing with the raised water dam fits within the interior perimeter of the window-receiving rough opening and is attached thereto. Integral with the L-shaped flashing is an outer flap that is designed to surround the flange of the window unit being installed. The outer flap has a weather strip positioned thereon behind the window flange. In a later patent application, namely. Ackerman et al., Patent Application Publication US 2005/0011140, a continuation-in-part of the above-cited patent, the use of a foam wedge as an under flange seal is shown.

Building on the 1990's state-of-the-art, Anastasi obtained a patent, U.S. Pat. No. 6,244,001, for a system of installing windows and doors in cavity walls. Here, a 40-mil thick extrusion having three vanes joined at a common edge is used. While the specific material is not delineated, it is suggested that the flashing is formed as a unitary piece from semirigid polypropylene. A drywall backup wall or inner wythe is shown with one vane or leg of the extrusion to be attached to the exterior face thereof corresponding with the edge of the rough opening and another leg attached to the inside face of the rough opening. The remaining vane is draped against the window frame and is held thereagainst by a sealant system comprised of a backer rod and caulking.

The after-flashing activity of window installation includes many steps, the omission of any one of which could effect the weatherproofing integrity. Among these activities are such steps as trimming excess flashing, installing a backer rod around the window perimeter, caulking around the perimeter atop the backer rod, filling the joint between the window frame and the rough opening jambs with loose insulation, filling the joint between the window frame and the rough opening sill with insulation, filling the joint between the window frame and the header, forming a sill flashing pan by turning the drip edge of the flashing membrane up against the window frame and installing the interior sealant bead along the jambs and the header. Complicating the technician's job by adding a large number of after-flashing installation steps leads inevitably to human error and consequently to incomplete work. Technical simplification becomes a curative element to such a morass.

In a different area of building construction, the inventor hereof teaches in a co-pending application about the use of polymeric foam backer materials for expansion joints. There testing revealed that some below-standard polymeric foam backer materials outgas upon exposure to certain environmental conditions and release undesirable remanent blowing gases. This deficiency was overcome by replacing substantially all of the remanent blowing gases with ambient air while maintaining the closed cell structure of the foam.

A prior art ASTM Standard suggested that such gaseous releases potentially compromise the intended performance of the backer material. However, elimination of outgassing has therefore necessarily preceded the use of the foam materials discussed hereinbelow so as to suit the foam materials for the specific building construction applications hereof. Particularly, the foam materials used herein are compatible with the weatherproofing membranes.

In the course of preparing this disclosure several patents became known to the inventors hereof. The following patents are believed to be relevant and are discussed further as to the significance thereof:

| Item | Patent No. | Inventor | Assignee | Issued/US Cl. |
|---|---|---|---|---|
| 1. | U.S. Pat. No. 6,479,119 (method claims only) | Simpson, R. S | MFM Bldg Products Corp Coshocton, Ohio | Nov. 12, 2002 428/40.1 |
| 2. | U.S. Pat. No. 6,627,017 | Simpson, R. S. | MFM Bldg Products Corp Coshocton, Ohio | Sep. 30, 2003 156/71 |
| 3. | U.S. Pat. No. 6,244,001 (cls. read on accessory unit-door/window) | Anastasi, L. L. | York MFG | Jun. 12, 2001 52/215 |

-continued

| Item | Patent No. | Inventor | Assignee | Issued/US Cl. |
|---|---|---|---|---|
| 4. | U.S. Pat. No. 6,305,130 | Ackerman Jr., D. S. | | Oct. 23, 2001 52/58 |
| 5. | U.S. Pat. No. 5,377,464 | Mott et al. | Owens-Corning Summit, Illinois | Jan. 3, 1995 52/213 |
| 6. | U.S. Pat. No. 6,725,610 | Murphy et al. | Exterior Research, LLC | Apr. 27, 2004 52/58 |

| Item | Published Appl. No. | Inventor | Pub. Date/ US Cl. |
|---|---|---|---|
| 7. | 2005/00111140 | Ackerman Jr., D. S. et al. | Jan. 20, 2005 52/58 |

Further, in the past manufacturers of window flashings sought to provide specifically configured fittings for corners, sills, headers and jambs. Consequently, certain flashing parts are specified for use with particular field-applied caulks and sealants, weatherstripping, adhesives, and insulation. Such specificity of product application leads to storage, order fulfillment, and quality control problems. It is readily seen that the provision of a more universal weatherproofing backer as described hereinbelow resolves such problems and avoids technical considerations of selecting the specific flashing and associated installation accessories for the application.

In recent years, the federal government has encouraged innovation in building materials by providing builders and manufacturers of energy-efficient homes with tax credits. The credit is available for qualifying residential structures that meet certain criteria. Using the appropriate weatherproofing materials, materials which improve the heat retention characteristic of the overall residential structure, enables the builders and manufacturers to more readily qualify for the tax credit.

The submission of the above discussion of documents is not intended as an admission that any such document constitutes prior art against the claims of the present application. Applicant does not waive any right to take any action that would be appropriate to antedate or otherwise remove any listed document as a competent reference against the claims of the present application.

SUMMARY

In general terms the weatherproofing backer of this invention is for use in window and door installation. Insofar as the weatherproofing backer hereof simplifies present practices, the introduction at this time is understandable by viewing the developments in foam technology and in adhesives technology. The foam sheet material is compressible, self-setting, and degassed and the adhesives are preferably clear, pressure-activated hot melts with high tack and fire retardant characteristics.

The weatherproofing backer hereof is provided in two embodiments, namely, a broad-tape weatherproofing backer and a peel-and-stick sheet weatherproofing backer. The broad-tape weatherproofing backer, when applied to a window installation is a foam web with a high-tack adhesive, preferably a pressure-activated hot melt clear adhesive. Strips of the broad-tape weatherproofing backer are applied in an abutting relationship to the sill, the jambs, and the header of the rough opening provided for the window unit. A lining portion of each strip covers the interior surface of the rough opening providing a compressible lining therefor. When the window unit is mounted, the lining fits securely against the inner frame of the window and seals thereagainst in a slip-fit relationship.

The strips of the broad-tape weatherproofing backer are then disposed on the exterior surface of the wall surrounding the rough opening. A portion of this tape seals to the underside of the flange of the window and the rest extends beyond so as to connect to the weatherproofing membrane. The window unit is installed in a manner wherein the flange seal portion is compressed with the facial plane thereof is intermediate that is intermediate that of the wall surface and that of the outer peripheral foam portion.

With the weatherproofing backer in place, the weatherproofing membrane is installed on top of the outer peripheral foam portion so that the weatherproofing backer bridges the window unit and the weatherproofing membrane. The bridge obviates the need for additional caulking and adhesives for exterior tapes, and for insulation. The foam bridge seals between the rough opening and the inner frame of the window unit, seals between the flange and the wall surface, and connects to the weatherproofing membrane. The flange is pressed into the foam which, being self-setting, molds to the shape of the flange and acts in addition as a thermal expansion joint. The broad-tape weatherproofing backer is provided either with or without a release sheet. When a release sheet is not used, a self-skinned foam layer is provided which enables the tape form to be reeled.

In sheet form, the weatherproofing backer is applied to the surface of the wall so that the sheet extends beyond the flange-covered area. The weatherproofing backer is cut to so that the portion over the rough opening can be turned inward to line the interior of the rough opening. The weatherproofing backer is dimensioned so that the lined opening seals against the inner frame of the window unit.

Both the foam web material and the pressure-activated adhesive layer have additives enabling the materials to meet strict fire retardant features. As noted in the above background all blowing gases have been removed from the foam using methods previously described by the Applicant.

OBJECTS AND FEATURES OF THE INVENTION

It is an object of the present invention to provide a weatherproofing backer which is economical to manufacture and is readily and simply installed.

It is another object of the present invention is to provide a weatherproofing backer of a polymeric foam material which, upon installation, is self-setting and molds to the surface of the window unit being installed.

It is a further object of the present invention to provide a weatherproofing backer constructed from a polymeric foam material that meets outgassing standards and conforms to and exceeds temperature range parameters.

It is a yet further object of the invention to provide a weatherproofing backer with compressibility and recovery characteristics that compensates for differentials in expansion contraction between building substrates and window structures over the entire temperature range of −70° F. to +180° F., thereby suiting it for use in climatic extremes.

It is a feature of the present invention that the adhesive layer thereof is pressure-activated and bonds to the rough surface of the building substrate extending into the interstices thereof and forming a mechanical bond therewith.

It is another feature of the present invention that, upon being compressively installed between the building substrate and the window structure, the weatherproofing backer is self-setting and molds to the intervening region, which is sealed making the region impervious to air and water flow therethrough.

It is yet another feature of the present invention that the weatherproofing backer hereof is resistant to ultraviolet radiation and does not deteriorate upon extended exposure thereto.

It is still yet another feature of the present invention that the weatherproofing backer hereof is formed from a doubly extruded foam wherein all blowing gases have been replaced by air and the foam is free of outgassing.

Other objects and features of the present invention will become apparent upon reviewing the drawing and reading together therewith the description which follows.

BRIEF DESCRIPTION OF THE DRAWINGS

In the following drawing, the same part in various views are afforded the same reference designators.

DESCRIPTION OF THE PREFERRED EMBODIMENTS

This invention discloses a weatherproofing backer for emplacement within a rough opening for a flanged window unit and upon the exterior wall surface adjacent the rough opening. The weatherproofing backer is formed from a polymeric foam—typically polyethylene foam, urethane foam, and neoprene foam and compressively seals between the inner frame of the window unit and the lined interior of the rough opening and between the flange of the window unit and the exterior wall surface of the rough opening. The weatherproofing backer is overlaid by the weatherproofing membrane or wrap and thus acts as a bridge-type seal between the window unit and the weatherproofing membrane. Although the aforementioned polymeric foams are most common other foamed material, such as rebonded-rubber foam may also be used. The foams of this invention are of service over the entire temperature range from −70° F. to 180° F.; thus, suiting the weatherproofing backer material to all climatic conditions.

Before proceeding with further details of the specification, several definitions are provided to aid in the understanding of the device. Here, wherever possible usage as close to the common understanding of the terms is adopted; however, as several specialized terms are used, a definition is adopted thereof which is clear, deliberate and precise.

For the purpose hereof, a self-setting foam window flashing is defined as a cellular structure consisting of both open and closed cells, most frequently polymeric in formation, and selected from such products to be moldable to the window unit being installed. Further, the self-setting characteristic is designed into the product by controlling the parameters of the compression set and recovery rates of the foam to be within certain predetermined ranges.

The weatherproofing backer has as a primary structural component thereof a polymeric foam. A polymeric foam is defined as a thermoplastic material that, after being subjected to a foaming or blowing agent, produces a cellular structure.

The weatherproofing backer is comprised of a cellular body portion and a skin portion. The cellular body portion may be open-cell, closed-cell, or a mixture of open and closed cell. A skin portion is defined as a self-skinned outer portion of the foam that has a surface precluding transfer of the pressure-activated adhesive. This enables the tape flashing to be rolled without the aid of a release sheet.

In use, the weatherproofing backer is compressed between the rough opening in a building and a window unit, such as a window unit with an integral flange. The weatherproofed cavity is defined as the opening formed by the facing surfaces of the structural components—the rough opening and the flanged window unit—and the backer-receiving region on the wall surface surrounding and extending beyond the flanges of the window unit.

Figure 1:
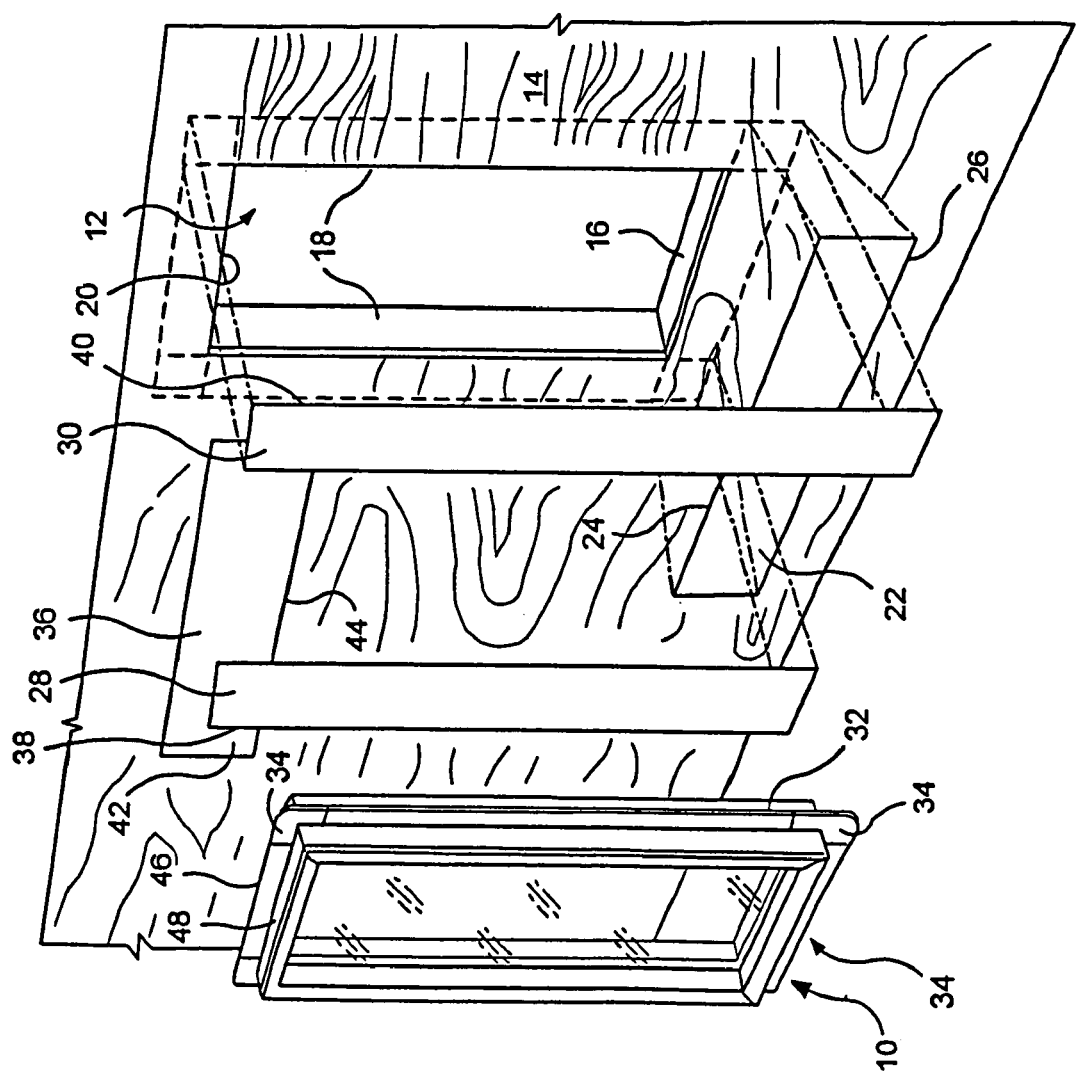
FIG. 1 is a perspective view of a prior art window flashing and installation thereof.

Referring now to FIG. 1, a typical prior art window flashing installation for an integral flanged window unit 10 is shown. This follows an American Architectural Manufacturers Association guideline. A rough opening 12 is sized to accept the window unit 10, which opening 12 is constructed with a fascia or substrate 14 backed by a sill 16, jambs 18, and header 20. A sill flashing 22 is mechanically fastened along the upper edge 24 thereof and is flush with the top edge of the sill 16. The lower edge 26 of the sill flashing 22 remains free so that a weather resistive barrier (not shown) can be applied thereunder.

The procedure is repeated with the jamb flashings 28 and 30. A continuous bead 32 of caulking or sealant is applied under window flange 34 and the window unit 10 is emplaced. A header flashing 36, which extends beyond the outer edges 38 and 40 of joint flashings 28 and 30, is mechanically attached at the upper edge 42 thereof so that the lower edge 44 covers head mounting flange 46. Another bead 48 of caulking or sealant is applied to the exterior surface of head mounting flange 46.

While the above paragraphs describe existing practices, numerous variations on the theme have been devised. Frequently additional steps are added to the procedure to incorporate installation of an air barrier, the insertion of loose insulation into the interior gap between the rough opening and the window unit, extra tape on the outside of the mounting flange, and plastic wraps for enveloping the mounting flange.

Figure 2:
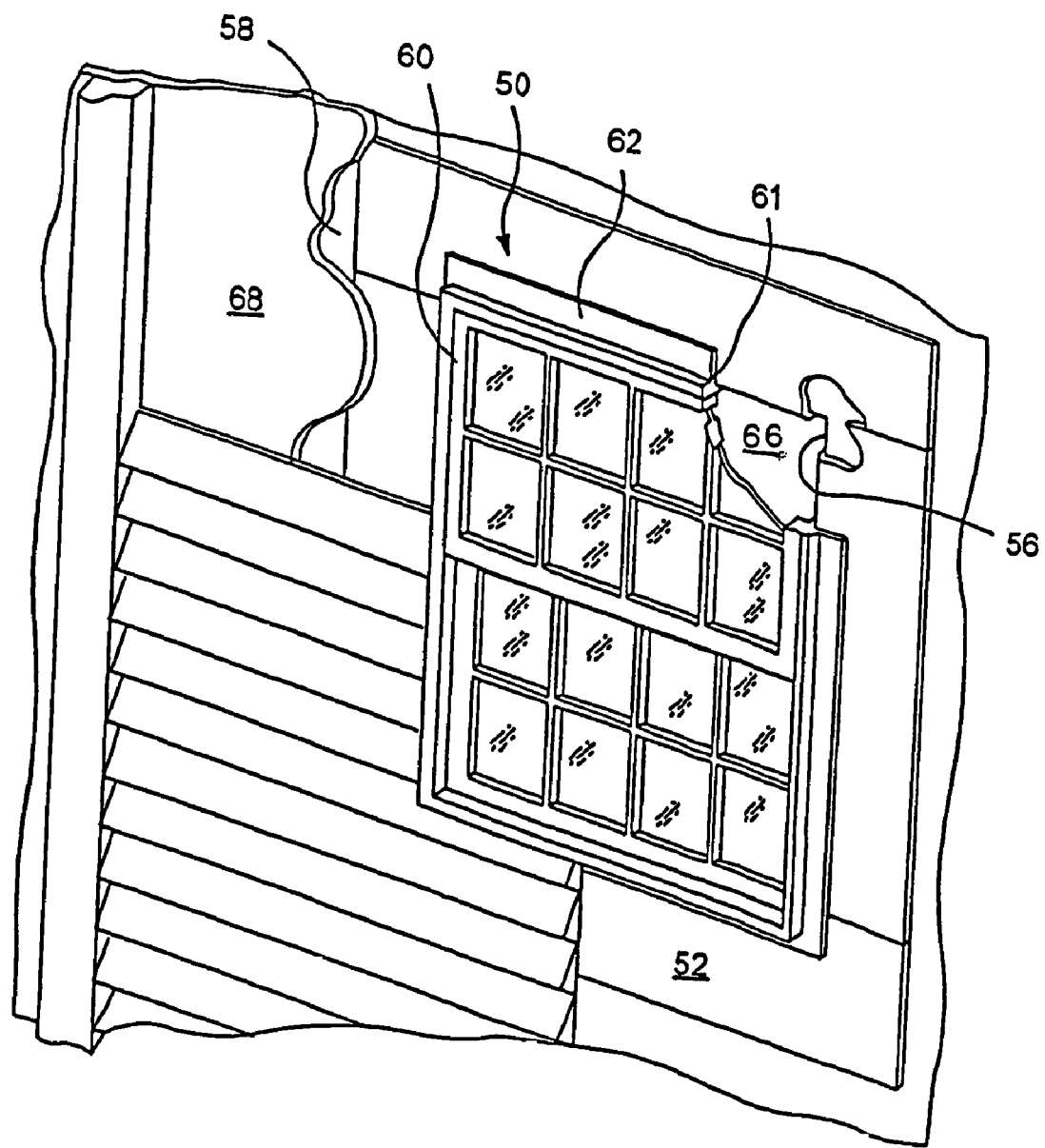
FIG. 2 is a perspective view of the weatherproofing backer of this invention shown with structural elements partially broken away.
Figure 3:
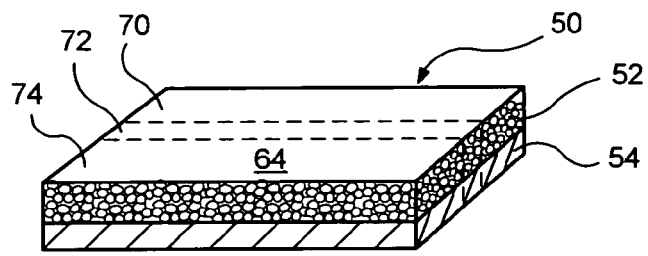
FIG. 3 is a cross-sectional view of the weatherproofing backer of FIG. 2.
Figure 4:
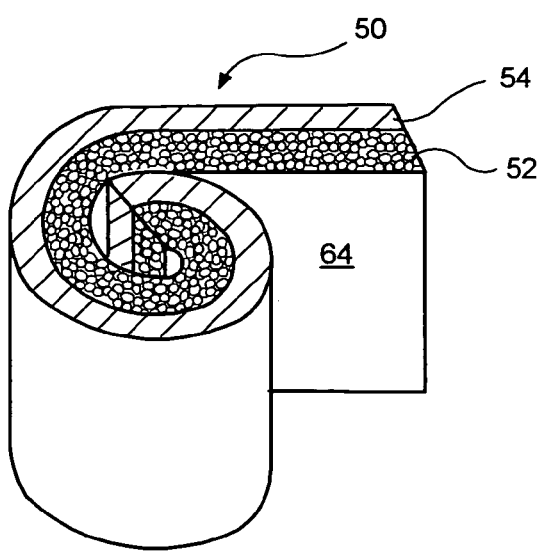
FIG. 4 is a perspective view of the tape roll form of FIG. 3.

Referring now to FIGS. 2, 3, and 4 a weatherproofing backer is shown and is generally referred to by the reference designator 50. The backer 50 has two primary components namely, the foam face and the pressure-activated adhesive layer 54—and several ancillary components described in the second embodiment. The foam facing or body 52 is cellular in structure and may contain open cells, closed cells or a mixture of open and closed cells. While almost any polymeric foam, usually a non-crosslinked foam is employed, a foam may be selected from urethane foam, neoprene foam and polyethylene foam. The adhesive layer 54 seals about attaching hardware passing therethrough. Additionally and optionally, a foam utilizing rebonded rubber may be employed.

In FIG. 2, the weatherproofing backer is shown as installed with portions of the siding, weatherproofing membrane, and window unit broken away to reveal the tape form of the weatherproofing backer 50. The backer 50 is constructed for disposition as a liner within the rough opening 56 and is adhered to the building fascia or substrate 58 beneath the window unit and extending therebeyond. The window unit 60 is constructed with an inner frame 61 and integral flange 62. With the flange 62 secured by attaching hardware 64 to the rough opening 56 with the weatherproofing backer 50 disposed as shown, the foam is compressed 20 to 80%. The foam molds to the weatherproofed cavity (as defined hereinabove) and seals the region from penetration by water, air, and water vapor. With the structure described, no additional insulation needs to be added to the window unit and no caulking is required. (Emphasis Added).

Referring now particularly to FIGS. 3 and 4 other aspects of the weatherproofing backer are discussed. In this embodiment, the foam face 52 has disposed on one of the two major surfaces thereof adhesive layer 54; and, on the other, a self-skinned layer 64, which layer does not bond to the adhesive and acts in lieu of to a release sheet. This enables the backer 50 to be rolled and unrolled without the adhesive layer 54 transferring onto the self-skinned layer 64.

As described above, the construction elements of the rough opening 56 in the wall surface or substrate 58 and the window unit 60 together define the weatherproofed cavity 66. These construction elements have, depending on the materials of construction, different rates of thermal expansion and contraction. With prior art flashing systems discussed above such differentials contribute to water and air penetration. Foam under compression, when selected with predetermined recovery characteristics overcomes such deficits. It has been found that foam having a recovery set in the to 80 percent range at 18 psi fulfills this requirement.

Frequently at construction sites delays are experienced exposing building materials to ultraviolet (UV) radiation for long periods of time. Thus, it has been customary to rate such products for 120 days or 180 days of UV exposure. With the foam and adhesive construct hereof, no deterioration has been experienced upon exposure to UV radiation.

The weatherproofing backer 50 is constructed with three functional segments. An opening liner portion 70 is constructed to adhere to the interior of the rough opening 56 sealing against the inner frame 61; a flange-sealing or under-flange seal portion 72 is constructed to adhere to the wall surface 58; and, extending beyond the perimeter of window flange 62, a weatherproofing-membrane backer portion 74 is constructed to adhere to wall surface 58 and to receive atop thereof weatherproofing membrane 68. In contrast to the application-specific flashings presently in the marketplace, the weatherproofing backer of this invention exhibits temperature stability over the −70° F. to 180° F. range. Thus, the seal integrity precluding penetration of water and air is maintained at both ends of the ambient temperature range rendering the present invention applicable under all climatic conditions.

Referring again to FIG. 2, the weatherproofing backer 50 further includes a hot melt adhesive layer 54 which is formulated for pressure activation and compatibility with the weatherproofing membranes 68. Optionally, a release sheet, see infra, is adhered thereto. The adhesives described herein are particularly useful for tape and peel-and-stick applications in building construction industry. The adhesives are readily pressure activated after removal from the tape roll or after the release paper is removed. The adhesive is formulated so that, in case of fire, the coatings thereof will not contribute to smoke or accelerate flame spreading and thus do not require inorganic fillers which have at times interfered with the adhesive function. Also, the adhesives are formulated to have sufficient tackiness so that a durable bond between the weatherproofing backer 50 and the rough and/or porous surface of the substrate 58 is experienced. The compressibility of the foam provides sealing upon abutting widths of the backer without the use of caulks and sealants at the joints thereof.

Incorporating by reference the Di Rado et al. patent, U.S. Pat. No. 5,106,447, the hot melt adhesive compositions of hot melt layer 54 may be prepared from 10 to 50 weight percent of an isotactic thermoplastic polybutene-1/ethylene copolymer containing from about 5.5 to about 10% by weight ethylene (polybutylene); 20 to 50 percent of a tackifier; 15 to 50 percent of an amorphous diluent having a softening point greater than 90 degrees C.; 0 to 2 percent of a stabilizer; and 0 to 5 percent wax.

The polybutylene copolymers employed herein are copolymers of polybutene-1 and ethylene wherein the ethylene content varies from about 5.5 to about 10% by weight of the copolymer. The applicable isotactic polybutylenes are relatively rigid while in their plastic form but flow readily upon being heated. Expressing molecular weight in terms of melt index, the applicable isotactic polybutylenes to be used in the present adhesive should exhibit a melt index in the range of from about 5 to 2000 dg/min and preferably from 400 to 700 dg/min. The latter melt flow values are determined by the method described in ASTM D1238 and are inversely related to molecular weight, i.e., the lower the melt index, the higher the molecular weight. These copolymers are available from Shell Chemical Company under the Duraflex trademark as Duraflex 8310, 8410, 8510 and 8910, with the 8910 having a melt index of about 700, a grade preferred for use herein. Mixtures of these copolymers may also be used.

The tackifying resins which may be used to extend the adhesive properties of the isotactic polybutylene include: (1) hydrogenated wood rosin or rosin ester; (2) polyterpene resins having a softening point, as determined by an ASTM method E28-58 T, of from about 80 degrees C. to 150 degrees C., the latter polyterpene resins generally resulting from the polymerization of terpene hydrocarbons in the presence of Friedel-Crafts catalysts at moderately low temperatures and including the latter resins which are aromatically modified; examples of commercially available resins of this type being the Nirez resins sold by Reichhold Chemical, the Zonatac resins sold by Arizona, and the Piccolyte S-10, S-25, S-40, S-85, S-100, S-115, S-125 and S-135 resins as sold by Hercules Chemical; (3) aliphatic petroleum hydrocarbon resins having a Ball and Ring softening point of from about 80 degrees C. to 160 degrees C., resulting from polymer-ization of monomers consisting primarily of 5 carbon atom olefins and diolefins, and including the latter resins which are aromatically modified, examples of commercially available resins of this type being Wingtack 95 and Wingtack Extra as sold by the Goodyear Tire and Rubber Company and the Escorez 1000 series of resins sold by the Exxon Chemical Corporation; and (4) partially and fully hydrogenated hydrocarbon resins such as Resin H-130 from Eastman, Escorez 5000 series from Exxon, and Regalrez from Hercules. The amorphous diluents which are needed and present in the adhesive composition include (atactic) amorphous polypropylene or other similar high softening point (i.e. greater than 90 degrees C.), low crystalline diluent, (e.g. amorphous polyalpha-olefins). These diluents, are used at levels of 20 to 50% by weight, preferably about 20 to 25% by weight.

To test the degree of tackiness of the above-described weatherproofing backer structure, a pull test is performed. An 8-inch by 12-inch sample is coated with a hot melt adhesive, namely, APC #915, manufactured by Adhesive Products Company, Indianapolis, Ind. 46235 which hot melt adhesive formulation includes one or more of the aforementioned tackifying resins. A suitable release paper is applied thereover. After a prescribed cure period, the release paper is removed and the backer of this invention is applied to the surface of a wood block. The application to the block is at room temperature utilizing a hand-operated laminating roller to provide the pressure activation. A spring scale is then backer from the block. Repeating the test for SBS-modified, peel-and-stick flashing, a force of 27 lb. (max.) is required to peel the flashing from the block.

Among the applicable stabilizers or antioxidants utilized herein are included high molecular weight hindered phenols and multifunctional phenols such as sulfur and phosphorous-containing phenols. Representative hindered phenols include: 1,3,5-trimethyl 2,4,6-tris (3,5-di-tert-butyl-4-hydroxy-benzyl)benzene; pentaerythrityl tetrakis-3 (3,5-di-tert-butyl-4-hydroxyphenyl) propionate; 4,4'methylenbis(2, 6-tert-butyl-phenol); 4,4'-thiobis (6-tert-butyl-o-cresol); 2,6-di-tertbutylphenol; 6-(4-hydroxy-phenoxy)-2,4-bis(octylthio)-1,3,5-triazine; di-n-octadecyl 3, 5-di-tert-butyl-4-hydroxy-benzylphosphonate; 2-(n-octylthio)-ethyl 3,5-di-tert-butyl-4-hydroxybenzoate; and sorbitol hexa [3-(3,5-di-tert-butyl-4-hydroxyphenyl)-propionate].

The performance of these antioxidants may be further enhanced by utilizing, in conjunction therewith known synergists such, for example, as thiodipropionate esters and phosphites. Particularly useful is distearylthiodipropionate. These stabilizers are generally present in amounts of about up to 2 weight percent, preferably 0.25 to 1.0%. It is also possible to add minor amounts (i.e. less than about 5% by weight of the formulation) of other diluents such as (1) waxes including petroleum waxes such as a paraffin wax having a melting point of from about 50 degrees C. to 75 degrees C. and microcrystalline wax having a melting point of from about 60 degrees to 90 degrees C.; the latter melting points being determined by ASTM method D127-60; (2) low molecular weight (600 to 3000) liquid polybutene; (3) polyethylene greases having a softening point of from about 80 degrees C. to 100 degrees C. and a hardness value, as determined by ASTM method D-1321, of from about 60 degrees C. to 120 degrees C.; (4) hydrogenated animal, fish and vegetable fats and oil such as hydrogenated tallow, lard, soya oil, cottonseed oil, castor oil, menhaden oil and cod liver oil; and (5) synthetic waxes made by polymerizing carbon monoxide and hydrogen, such as Fischer-Tropsch wax.

In addition, relatively small amounts (less than about 5%) of isotactic polypropylene may be employed as a reinforcing agent. Other additives such as flow modifiers, fire retardants, pigments, dyestuffs, etc., which are conventionally added to hot melt adhesives for various end uses may also be incorporated in minor amounts into the formulations of the present invention. The fire retardants added preclude flash ignition and meet the requirements of FAR 25.853B.

Figure 5:
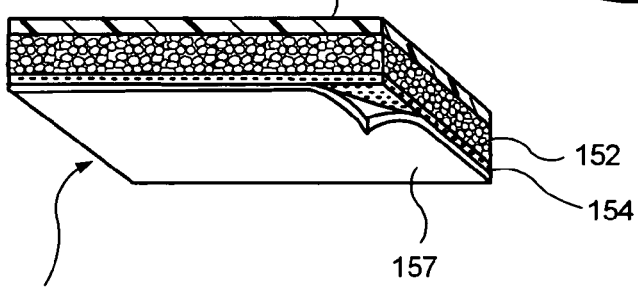
FIG. 5 is a second embodiment of the weatherproofing backer having a laminated film atop the foam and a release sheet on the adhesive layer.
Figure 6:
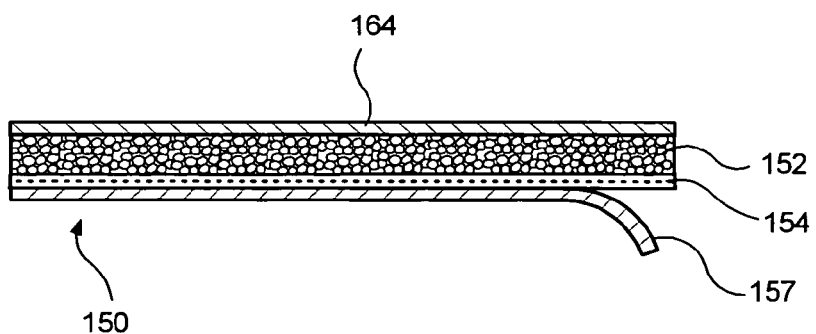
FIG. 6 is a cross-sectional view of FIG. 5.

The description which follows is of a second embodiment of the weatherproofing backer of this invention. For ease of comprehension, where similar parts are used reference designators "100" units higher are employed. Thus, the adhesive layer 154 of the second embodiment is analogous to the adhesive layer 54 of the first embodiment. Referring now to FIGS. 5 and 6, the second embodiment of the weatherproofing backer of this invention is shown and is referred to generally by the numeral 150.

In FIGS. 5 and 6, the sheet form of the weatherproofing backer 150 The backer 150 is constructed to be mounted on the wall surface so as to extend beyond the window flange in all directions and to cover the rough opening. As described hereinbelow, the construct is designed to be cut and flaps formed from the portion covering the rough opening turned inward to line the interior of the rough opening. In the sheet form, the weatherproofing backer 150 comprises a foam body 152 and an adhesive layer 154. As in the first embodiment, the adhesive layer 154 seals about attaching hardware. Prior to application, release sheet 157 which is disposed on adhesive layer 154 is removed.

In contrast to the first embodiment, the second embodiment has a lamina or polymeric layer 164 disposed thereon which acts in a cooperative functional relationship with the weatherproofing membrane or wrap. This layer 164 may be a plastic film, a non-woven or woven scrim, or a composite thereof.

Figure 7:
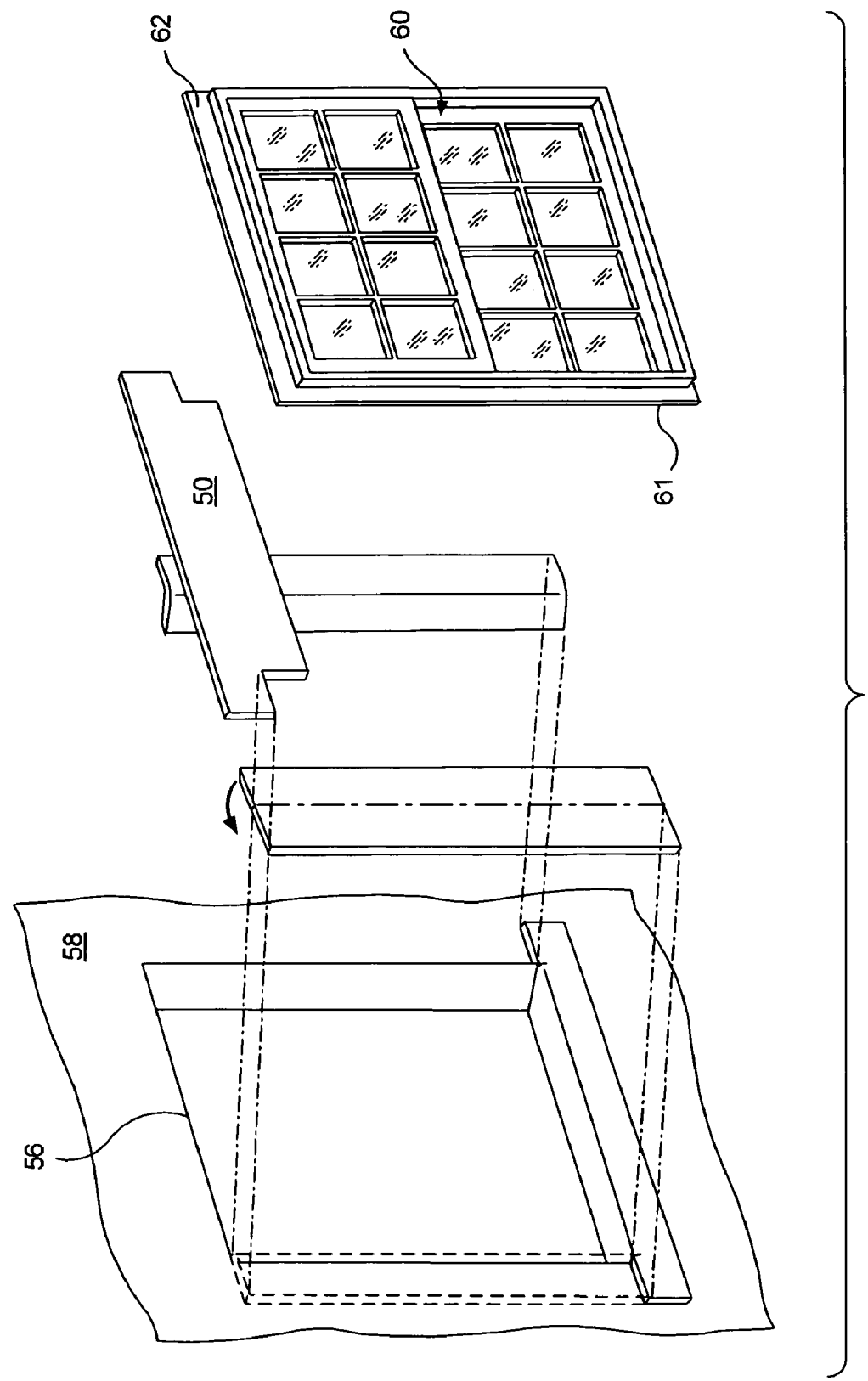
FIG. 7 is a partially exploded view of the weatherproofing backer of the first embodiment showing the installation thereof.
Figure 8:
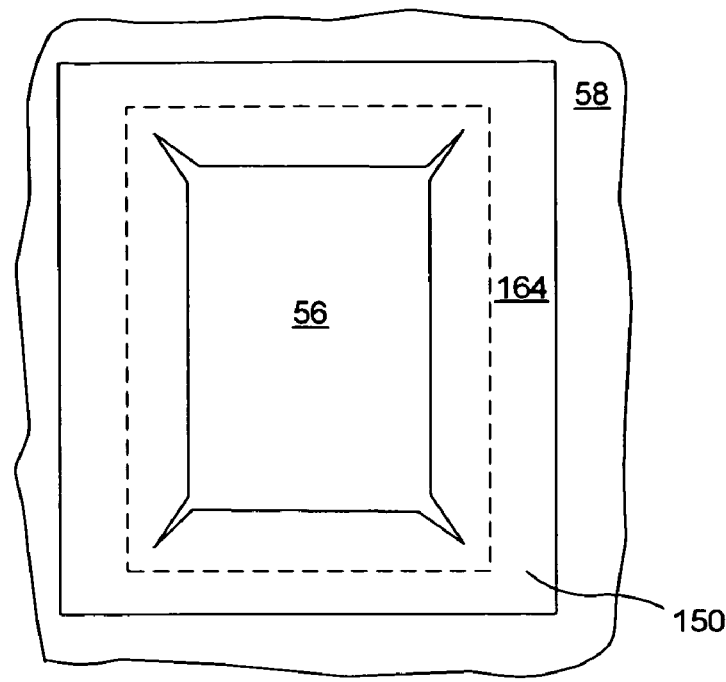
FIG. 8 is a front view of the weatherproofing backer of the second embodiment showing the installation thereof; and, FIG. 9 is a rear view of the weatherproofing backer of the second embodiment showing the installation thereof.
Figure 9:
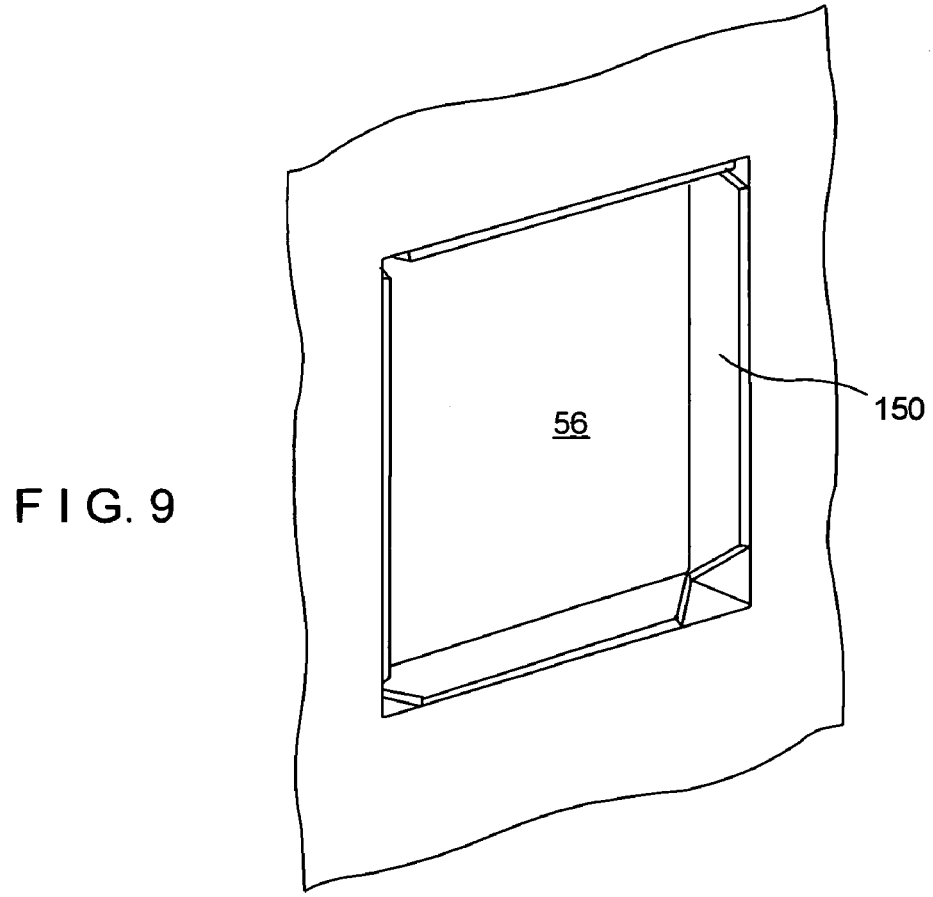

For installation, reference is made to FIGS. 7, 8 and 9. In utilization of the weatherproofing backer 50 of this invention, unlike conventional window flashings, only a few simple steps are required. Before installing windows and doors, the rough openings 56 therefor are checked against the manufacturer's specification. (The rough opening for a door omits the sill and sill jacks of the window opening.) Then, for the broad-tape weatherproofing backer 50, the window is installed as follows:

a. adhering a weatherproofing backer to the interior of the rough opening so as to form a lined sleeve for the inner frame of the window unit 60. While the sequencing is not significant, this may be completed by the substeps of:

(1) installing the jamb strips;

(2) abutting the sill strip against the jamb strips;

(3) abutting the header strip against the jamb strips; and, b. adhering said weatherproofing backer to the exterior surface of said wall and extending said weatherproofing backer beyond the region occupied by the flange;

The window installation is completed by:

c. inserting the window unit into the sleeve with the inner frame compressively sealing thereagainst;

d. securing the flange of the window unit to the wall with attaching hardware, the attaching hardware passing through and sealing against the adhesive layer of the weatherproofing backer;

e. adjusting securement of step d. to resiliently deform the weatherproofing backer with the surface plane of the flange being intermediate the plane of the wall surface and of the uncompressed weatherproofing backer extending beyond the flange; and, f. installing a weatherproofing membrane atop the weatherproofing backer by attaching the weatherproofing membrane to the wall with attaching hardware, the attaching hardware passing through and sealing against the adhesive layer of the weatherproofing backer beyond the region occupied by the flange.

In the manner just described, the weatherproofing backer 50 seals against the inner frame and the underside of the flange of the window unit and bridges between such seals and the weatherproofing membrane.

In utilizing the sheet-like form of the weatherproofing backer 150, the above method is adapted by first adhering the backer to the wall surface so that the rough opening is approximately centered within the sheet. Then, lining the rough opening, see FIGS. 8 and 9, by the substeps of:

(1) cutting the weatherproofing backer disposed over the rough opening to form flaps for lining the rough opening; and, (2) trimming the excess weatherproofing backer extending beyond the interior surface of the wall.

The above-described weatherproofing backer provides a self-adhering window and door wrap and an expansion joint therefor. A simplification of window installation is provided hereby eliminating the need for the many after-flashing procedures, including taping over flanges, adding loose insulation to the opening, and using beads of caulking to seal the cavity.

Other variations of the embodiments shown can be utilized without departing from the spirit of the claims which follow. For example while the adhesive in the above embodiments is shown as a clear, pressure-activated adhesive, other adhesive systems, such as butylated adhesive, bituminous adhesive, hot-melt adhesive, water-based acrylic adhesive, and mixtures thereof may be used without departing from the spirit of the above invention. Also the waterproof backer is shown as a unitary structure, however the invention extends to separate applications of adhesive and foam materials, including such applications as double-sided and single-sided tapes and field-applied adhesives.

What is claimed is:

1. A weatherproofing backer for use in window installation in building structures having an exterior wall with a rough opening therethrough, said rough opening with an interior surface for receiving a flanged window unit having a window flange, said wall being a substrate for a weatherproofing membrane and said flanged window unit, said flanged window unit and said weatherproofing membrane having a juncture, said weatherproofing backer comprising, in combination:
   a self-setting foam web having two surfaces, said foam web having a predetermined recovery rate and being self-setting with a compression set of 20 to 80 percent at 18 psi, said foam web maintaining the cavity between said window unit and said opening therefor compressively filled, said foam web selected from a group consisting of an open cell structure, a closed cell structure, and a structure of open and closed cells;
   a pressure-activated adhesive layer disposed on one of said two major surfaces, said adhesive layer having sufficient tack to, upon pressure activation, be adapted to durably adhere said weatherproofing backer to said substrate, said weatherproofing backer configured to extend beyond said window flange and engage said weatherproofing membrane to form a sealed bridge between said window flange and said weatherproofing membrane; and,
   whereby said juncture between said flanged window unit and said weatherproofing membrane is sealed against water and air penetration.

2. A weatherproofing backer as described in claim 1 wherein said window unit has flanges thereabout securable to said substrate by attaching hardware extending through said weatherproofing backer and into said substrate, said adhesive layer being adapted to seal said attaching hardware thereby maintaining integrity of the seal against water and air penetration.

3. A weatherproofing backer as described in claim 1 wherein said predetermined recovery rate of said foam web provides said compressively filled condition over the temperature range of −70° F. to +180° F.

4. A weatherproofing backer as described in claim 1 wherein said foam web has a predetermined compression set adapting said foam web to mold to the exterior configuration of said flanges of said window unit.

5. A weatherproofing backer as described in claim 4 further comprising:
   a release sheet adhered to said adhesive layer, said release sheet being removable prior to mounting of said weatherproofing backer.

6. A weatherproofing backer as described in claim 1 wherein said pressure-activated adhesive layer is an adhesive selected from the group consisting of a hot melt adhesive, a butyl-based adhesive, an acrylic adhesive, a water-based adhesive, a bituminous adhesive, and mixtures thereof.

7. A weatherproofing backer as described in claim 6 wherein said foam web further comprises a fire retardant additive.

8. A weatherproofing backer as described in claim 7 wherein the presence therein of a predetermined quantity of said fire retardant additive forms a self-extinguishing rated foam web;
   whereby said weatherproofing backer meets standards for avoidance of smoke generation and flame acceleration.

9. A weatherproofing backer for use in building construction having a wall with a rough opening therethrough for receiving a window unit having flanges thereabout and a waterproofing membrane thereover, said wall being a substrate for said window unit and said waterproofing membrane, said flange having a face plane, said window flashing comprising in combination:
   a self-setting foam web having two major surfaces, said foam web having a predetermined recovery rate, said foam web for maintaining the cavity between said window unit and said opening therefor compressively filled;
   a polymeric covering web laminarly disposed on one of said major surfaces of said foam web, said polymeric covering web adapted and selected for compatibility with said waterproofing membrane;
   a pressure-activated adhesive layer disposed on said two major surfaces opposite said polymeric covering layer, said adhesive layer having sufficient tack to, upon pressure activation, be adapted to durably adhere said weatherproofing backer to said substrate; and,
   said foam web disposed all about said opening and adapted upon installation of said window unit, configured to extend beyond said flange thereof and to underlie said weatherproofing membrane forming a sealed bridge between said window flange and said weatherproofing membrane;
   said window unit adapted to be compressively disposed on said weatherproofing backer with said face plane of said flange intermediate the face plane of said wall and a face plane of said weatherproofing backer;
   whereby said opening for receiving said window unit is sealed against water and air penetration.

10. A weatherproofing backer as described in claim 9 wherein said foam web is selected from a group consisting of an open cell structure, a closed cell structure, a structure of open and closed cells, a crosslinked structure, and a non-crosslinked structure.

11. A weatherproofing backer as described in claim 9 further comprising:
   a release sheet adhered to said adhesive layer, said release sheet adapted to be removable prior to mounting on said substrate.

12. A weatherproofing backer as described in claim 9 wherein said pressure-activated adhesive layer is an adhesive selected from the group consisting of a hot melt adhesive, a butyl-based adhesive an acrylic adhesive, water-based adhesive, a bituminous adhesive, and mixtures thereof.

13. A weatherproofing backer as described in claim 9 wherein said foam web is reprocessed to remove any remanent blowing gases and replace said gases with ambient air, thereby precluding outgassing.

14. A weatherproofing backer for use in building construction having a wall with an opening therethrough for receiving a window unit having flanges thereabout, said wall being substrate for a weatherproofing membrane and said window unit, said weatherproofing backer comprising in combination:
- a self-setting foam web having two major surfaces, said foam web having a predetermined recovery rate and being self-setting with a compression set of 20 to 80 percent at 18 psi;
- a pressure-activated adhesive layer disposed on one of said two major surfaces, said adhesive layer having sufficient tack to, upon pressure activation, be adapted to durably adhere said window flashing to said substrate, said weatherproofing backer configured to extend beyond said window flange and engage said weatherproofing membrane, said pressure-activated adhesive layer is an adhesive selected from the group consisting of a hot melt adhesive, a butyl-based adhesive, an acrylic adhesive, a water-based adhesive, a bituminous adhesive, and mixtures thereof; and,
- said foam web disposed all about said opening and adapted to have said window unit compressively disposed thereon;

whereby said opening for receiving said window unit is sealed against water and air penetration.

15. A weatherproofing backer as described in claim 14 wherein said window unit has flanges thereabout securable to said substrate by attaching hardware extending through said weatherproofing backer and into said substrate, said adhesive layer being adapted to seal said attaching hardware thereby maintaining integrity of the seal against water and air penetration.

16. A weatherproofing backer as described in claim 15 wherein said predetermined recovery rate of said foam web adapts said foam web to maintain the cavity between said opening and said window unit in a compressively filled condition over the temperature range of −70° F. to +180° F.

17. A weatherproofing backer as described in claim 14 wherein said foam web further comprises a fire retardant additive wherein the presence therein of a predetermined quantity of said fire retardant additive forms a self-extinguishing rated foam web;
whereby said foam web meets standards for avoidance of smoke generation and flame acceleration.

18. A weatherproofing backer for use in building construction having a wall with a rough opening therethrough for receiving a window unit with a flange thereabout, an exterior surface of said wall being a substrate for weatherproofing membrane and said window unit, said weatherproofing backer comprising in combination:
- a self-setting foam web having two major surfaces, said foam web having a predetermined recovery rate, said foam web configured to maintain the cavity between said window unit and said opening therefore compressively filled, said foam web selected from a group of an open cell structure, a closed cell structure, and a structure of open and closed cells said foam web, in turn, comprising:
  - a liner portion adapted, upon installation, to cover the interior surface of said rough opening;
  - a seal portion adjacent to and contiguous with said line portion adapted, upon installation, to compressively seal against said flange of said window unit;
  - an outer peripheral portion adjacent and contiguous with said seal portion adapted, upon installation, to receive said weatherproofing membrane thereon; and,
- a pressure-activated adhesive layer disposed on one of said two major surfaces, said adhesive layer having sufficient tack to, upon pressure activation, be adapted to durably adhere to said weatherproofing backer to said substrate.

19. A weatherproofing backer as described in claim 18 wherein said window unit further comprises attaching hardware mountable through said flange and wherein said weatherproofing backer further comprises:
- said adhesive layer, upon installation of said window unit, adapted to seal said attaching hardware without water and air penetration.

20. A weatherproofing backer as described in claim 19 wherein, upon installation of said window unit, said weatherproofing backer configured to extend beyond said window flange and engage said weatherproofing membrane to form a sealed bridge between the interior surface of said flange of said window unit and the interior surface of said weatherproofing membrane.

21. A weatherproofing backer as described in claim 20 wherein, upon tightening of said attaching hardware, said weatherproofing backer is adapted to be resiliently deformed and to form an expansion joint between said flange of said window unit and said exterior surface of said wall.

22. A weatherproofing backer as described in claim 21 wherein said foam web of said expansion joint is selected for a predetermined recovery rate to maintain a sealed condition over a temperature range of −70° F. to +180° F.

23. A weatherproofing system for use in building structures having a wall with a rough opening therethrough for receiving a window unit with a flange thereabout, an exterior surface of said wall being a substrate for said window unit, said weatherproofing system comprising, in combination:
- a foam liner portion formed from a polymeric web having two major surfaces adapted, upon installation, to line the interior of said rough opening;
- a foam seal portion formed from a polymeric web having two major surfaces, said foam seal portion adjacent to and contiguous with said foam liner portion, said foam seal portion adapted, upon installation, to compressively seal against said flange of said window unit, to be resiliently deformed thereby, and to be disposed on said substrate;
- a foam outer peripheral portion formed from a polymeric web having two major surfaces, said foam outer peripheral portion adjacent to and contiguous with said foam seal portion adapted, upon installation, to be disposed on said substrate;
- a pressure-activated adhesive layer disposed on one of said two major surfaces of said foam liner portion, of said foam seal portion and of said foam outer peripheral portion, said adhesive layer having sufficient tack to, upon pressure activation, be adapted to respectively adhere said foam liner portion to said interior of said rough opening and said foam seal portion and said foam outer peripheral portion to said substrate; and,
- a weatherproofing membrane disposed on said substrate and extending over said foam outer peripheral portion and said foam seal portion and attached to said substrate therethrough.

24. A weatherproofing system as described in claim 23 wherein said window unit further comprises an inner frame and wherein said foam liner portion has a predetermined thickness and adapts said window unit to upon installation, to compressively seal said inner frame against said foam liner portion whereby the requirement for adding additional insulation is obviated.

25. A weatherproofing system as described in claim 24 wherein said polymeric web forming said foam seal portion is self-setting and is adapted to mold to said flange of said window unit, to have sufficient memory upon thermal contraction to maintain intimate contact with said flange of said window unit and to have sufficient resilience upon thermal expansion to maintain intimate contact with said flange of said window unit.

26. A weatherproofing system as described in claim 25 wherein said polymeric web maintains the sealed condition over a temperature range of −70° F. to +180° F.

* * * * *